June 20, 1933. E. S. MacPHERSON 1,915,134
STABILIZING MEANS FOR VEHICLE SPRINGS
Filed May 2, 1932

Inventor
Earle S. MacPherson

Whittemore Hulbert
Whittemore Belknap
By
Attorneys

Patented June 20, 1933

1,915,134

UNITED STATES PATENT OFFICE

EARLE S. MacPHERSON, OF DETROIT, MICHIGAN, ASSIGNOR TO HUPP MOTOR CAR COMPANY, OF DETROIT, MICHIGAN, A CORPORATION OF VIRGINIA

STABILIZING MEANS FOR VEHICLE SPRINGS

Application filed May 2, 1932. Serial No. 608,780.

This invention relates generally to vehicle chassis constructions and refers more particularly to stabilizing means for vehicle springs.

In the manufacture of motor vehicles, it is desirable to provide suspension springs of maximum flexibility so as to permit relative free movement of the axle vertically with respect to the chassis and thereby eliminate abrupt movements of the frame. Unfortunately, however, the greater the flexibility of the suspension springs the greater the tendency is for the vehicle body to side sway when the springs at one side of the body deflect relative to the springs at the opposite side of the vehicle. The above tendency usually results from turning the vehicle at relatively high speeds and is objectionable since it gives the occupants the impression that the entire vehicle is tipping.

The present invention contemplates eliminating the foregoing objection incident to employing relatively flexible suspension springs by providing stabilizing means designed to reduce side sway of the body to a minimum irrespective of the flexibility of the springs and fashioned to permit unobstructed deflection of the springs upon vertical movement of the axle bodily relative to the frame so as to permit securing the advantages resulting from the use of relatively flexible suspension springs.

More specifically, the invention contemplates the provision of means responsive to deflection of one of the springs for transmitting stresses to which this spring is subjected to the opposite spring in such a manner that the latter tends to stabilize the action of the former.

A further advantageous feature of the present invention resides in the provision of means for supporting the frame by the suspension springs in a substantially horizontal plane irrespective of any slight variations in the flexibility of the springs.

A still further object of the present invention resides in the provision of means incorporated within the stabilizing device for compensating for any slight variations in the flexibility of the springs when the same are in their normal positions.

The foregoing as well as other objects will be made more apparent as this description proceeds, especially when considered in connection with the accompanying drawing, wherein.

Figures 1, 4:
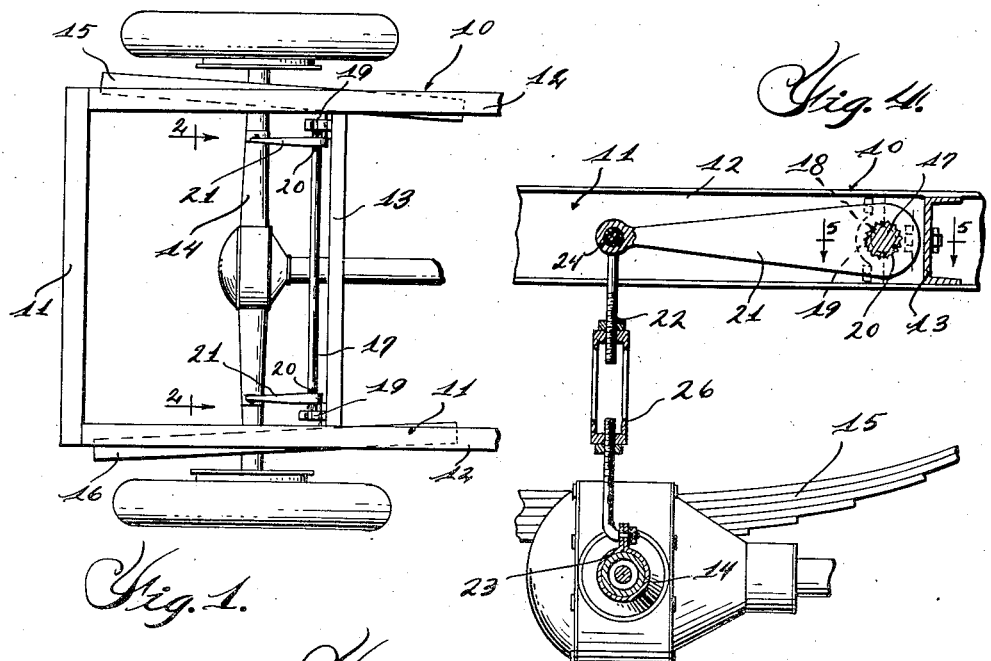
Figure 1 is a fragmentary top plan view of a chassis construction illustrating the application of a stabilizing device constructed in accordance with this invention.
Figure 4 is a sectional view taken substantially on the line 4—4 of Figure 2.
Figures 2, 5:
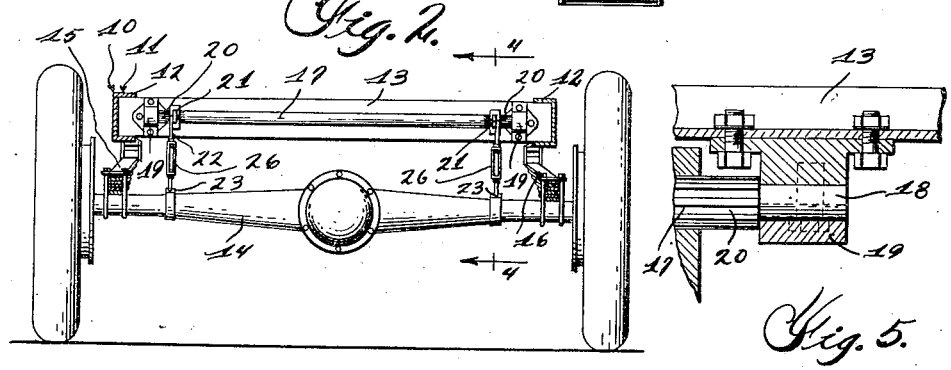
Figure 2 is a cross sectional view taken substantially on the line 2—2 of Figure 1.
Figure 5 is a detail sectional view taken substantially on the line 5—5 of Figure 4.
Figure 3:
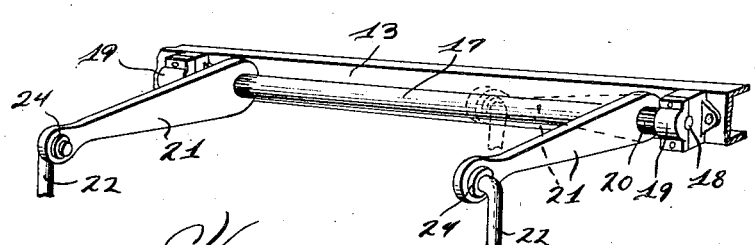
Figure 3 is a fragmentary perspective view featuring the stabilizing device.

For the purpose of illustration, the present invention is shown in association with the rear end portion of a motor vehicle chassis 10 comprising a frame 11 having longitudinally extending side sills 12 secured in lateral spaced relation to each other at the rear ends by means of a cross brace 13. The cross brace 13 is located in advance of the rear axle 14 of the vehicle, and the opposite end portions of the latter are suitably connected to the side sills 12 by means of semi-elliptical springs 15 and 16.

In general, the spring stabilizer forming the subject matter of this invention comprises means responsive to deflection of one of the springs on one side of the chassis for transmitting stresses to which the latter spring is subjected to the spring on the other side of the chassis in such a manner as to substantially equalize deflection of both springs and thereby minimize side sway of the vehicle. It will further be apparent as this description proceeds that the aforesaid means offers practically no resistance to vertical movement of the axle bodily relative to the frame so that this means, in addition to stabilizing the springs in the manner previously set forth to overcome the objection in providing relatively flexible suspension springs, also permits securing the desired advantages incident to employing springs of this character.

In detail, the stabilizer comprises a torsion bar 17 extending transversely of the vehicle to one side of the cross brace 13 and having reduced end portions 18 journaled within suitable bearings 19 carried by the cross brace 13. The portions of the bar 17 adjacent the reduced ends 18 thereof are splined as at 20 for non-rotatably receiving levers 21 extending rearwardly from the bar and respectively connected to the opposite end portions of the axle. The connection between the free ends of the levers 21 and the axle preferably comprises an adjustable link 22 having the lower ends thereof suitably rigidly clamped to the axle as at 23 and having the upper ends thereof pivotally connected to the free ends of the levers 21. The pivotal connection between the links and levers is such as to provide for relative movement of the latter members about an axis substantially parallel to the axis of the torsion bar 17 so as to compensate for the relative movement of the free ends of the levers 21 and axle 14. While the pivotal connections aforesaid may be of any suitable character, nevertheless, I have shown the same herein as comprising rubber sleeves 24 fashioned to receive the upper ends of the links 22 and adapted to be compressed within suitable openings formed in the free ends of the levers 21. This type of connection has achieved considerable recognition in the trade due to its anti-squeak characteristics and owing to the fact that it requires no lubrication.

With the construction as thus far described, it will be apparent that in the event the axle is displaced bodily vertically relative to the frame, the torison bar 17 merely oscillates within the bearings 19, and, as a consequence, does not resist or interfere with the action of the springs 15 and 16. As previously stated, this arrangement is desirable since it provides for obtaining the full advantage of the flexibility of the springs, and thereby eliminates abrupt shocks being transmitted to the frame incident to employing too great a resistance to vertical movement of the axle.

While maximum flexibility is of prime importance in instances where the axle moves bodily relative to the frame, nevertheless, it has been found to be extremely objectionable in the event one of the springs is deflected relative to the other since it effects an appreciable side sway of the body usually mounted on the frame. In order to illustrate the manner in which the present invention minimizes side sway of the frame, it will be assumed that the spring 16 is deflected relative to the spring 15 either by upward movement of the corresponding end of the axle or by downward movement of the adjacent side of the frame as would be the case in the event the vehicle is turned sharply in a right-hand direction as viewed from the rear of the same. Deflection of the spring 16 relative to the spring 15 tends to move the free end of the lever 21 adjacent the spring 16 upwardly. However, since the aforesaid lever is splined to the torsion bar 17, and since the opposite end portion of the bar is connected to the spring 15, it necessarily follows that the deflection stresses to which the spring 16 is subjected are transferred by the bar to the spring 15 tending to equalize deflection of both springs. The degree of deflection equalization of the springs depends upon the resistance offered by the torsion bar 17 to rotative movement of one end thereof relative to the other, and this resistance is predetermined so as to provide the desired operation of the device. Thus, from the foregoing, it will be apparent that I have provided a stabilizer for the spring action of vehicles so designed as to permit obtaining the desired advantages resulting from the use of relatively flexible springs without experiencing the objectionable body roll incident to employing springs of this character.

As previously stated, it is a further object of the present invention to incorporate in the spring stabilizer means for compensating for any manufacturing inaccuracies in the formation of the springs 15 and 16. The above feature is accomplished herein by providing means whereby the length of the links 22 may be readily varied. In detail, each of the links 22 are formed of two sections coaxially arranged with respect to each other and having the inner ends thereof adjustably connected by means of a turnbuckle 26 or any other suitable adjustable device. The arrangement is such that in the event it is found that the chassis frame is inclined transversely in its normal position due to the fact that one of the springs is slightly weaker than the other, the link 22 adjacent the stronger of the two springs may be shortened slightly by proper manipulation of the turnbuckle 26 thereon. Inasmuch as the springs of each bar are usually substantially identical, the adjustment required would ordinarily be relatively slight and insufficient to materially effect the flexibility of the springs.

While in describing the present invention particular stress has been placed upon the specific construction of the several parts involved, it is to be understood that various modifications may be resorted to to effect the desired results heretofore stated, and, accordingly, reservation is made to make such changes in the construtcion as may come within the purview of the accompanying claims.

What I claim as my invention is:

1. A vehicle chassis construction having in combination, a frame, an axle extending transversely of the frame, suspension springs on opposite sides of the frame connecting the latter to the axle, a torsion bar extending transversely of the frame and carried thereby, levers fixed to the torsion bar adjacent opposite ends thereof, attaching means carried by the axle adjacent opposite ends thereof, means establishing an operative connection between the free ends of the levers and axle including adjustable linkage having the upper ends connected to the free ends of the levers for oscillation relative to the latter substantially about an axis parallel to the axis of the torsion bar and having the lower ends connected to the attaching means for lateral oscillation relative to the axle.

2. A vehicle chassis construction having in combination, a frame, an axle extending transversely of the frame, suspension springs on opposite sides of the frame connecting the latter to the axle, a torsion bar extending transversely of the frame and journaled upon the latter for rotation relative thereto, levers fixed to the torsion bar adjacent opposite ends thereof, attaching means carried by the axle adjacent opposite ends of the latter, means establishing an operative connection between the free ends of the levers and attaching means aforesaid including linkage having the upper ends connected to the levers for oscillation relative thereto and having the lower ends connected to the attaching means for oscillation relative to the axle, and means for adjusting the length of the linkage to compensate for variations in construction of the springs.

3. A vehicle chassis construction having in combination, a frame, an axle extending transversely of the frame, suspension springs on opposite sides of the frame connecting the latter to the axle, a torsion bar extending transversely of the frame and carried thereby, levers fixed to the torsion bar in spaced relation to each other axially of the bar, attaching means carried by the axle adjacent opposite ends of the latter, linkage connecting the free ends of the levers to the attaching means on said axle and means associated with the connection between each lever and axle for independently varying the effective lengths of said connections.

4. A vehicle chassis construction having in combination, a frame, an axle extending transversely of the frame, suspension springs on opposite sides of the frame connecting the latter to the axle, a torsion bar extending transversely of the frame and journaled upon the latter for rotation relative thereto, levers fixed to the torsion bar in spaced relation axially of the bar, means connecting the free ends of the levers to the axle including links having the upper ends secured to the free ends of the levers for pivotal movement about axes extending substantially parallel to the axis of the bar and having the lower ends secured to the axle for oscillation relative thereto substantially about axes extending transversely of the axis of the axle.

5. A vehicle chassis construction having in combination, a frame, an axle extending transversely of the frame, suspension springs on opposite sides of the frame connecting the latter to the axle, a torsion bar extending transversely of the frame and journaled upon the latter for rotation relative thereto, levers fixed to the torsion bar in spaced relation axially of the bar, means connecting the free ends of the levers to the axle including links having the upper ends secured to the free ends of the levers for pivotal movement about axes extending substantially parallel to the axis of the bar and having the lower ends secured to the axle for pivotal movement about axes extending transversely of the axis of the axle to permit vertical movement of one end of the axle relative to the other without straining said linkage, and means for independently varying the effective lengths of the links to compensate for variations in the suspension springs.

6. A vehicle chassis construction having in combination, a frame having laterally spaced longitudinally extending side sills, a cross member extending transversely of the frame and interconnecting the side sills, an axle also extending transversely of the frame, suspension springs on opposite sides of the frame connecting the latter to the axle, a torsion bar extending substantially parallel to the cross member, bearings fixed to the cross member adjacent opposite ends thereof and forming journals for the torsion bar, levers fixed to the torsion bar adjacent opposite ends thereof, attaching means carried by the axle adjacent opposite ends of the latter, and linkage connecting the free ends of the levers and attaching means.

7. A vehicle chassis construction having in combination, a frame having longitudinally extending laterally spaced side sills, a cross member extending transversely of the frame interconnecting the side sills, an axle also extending transversely of the frame, suspension springs on opposite sides of the frame connecting the latter to the axle, a torsion bar extending substantially parallel to the cross member, bearings fixed to the cross member adjacent opposite ends thereof and forming journals for the torsion bar, levers fixed to the torsion bar adjacent opposite ends thereof, linkage connecting the free ends of each of the levers to the axle, and means for adjusting the linkage to vary the distance between the free ends of the levers and axle.

In testimony whereof I affix my signature.

EARLE S. MacPHERSON.